(12) United States Patent
Yonekura et al.

(10) Patent No.: US 8,042,298 B1
(45) Date of Patent: Oct. 25, 2011

(54) FISHING LURE

(76) Inventors: George Yonekura, San Jose, CA (US); Gary Gill, San Jose, CA (US)

( * ) Notice: Subject to any disclaimer, the term of this patent is extended or adjusted under 35 U.S.C. 154(b) by 573 days.

(21) Appl. No.: 12/217,441

(22) Filed: Jul. 3, 2008

Related U.S. Application Data

(60) Provisional application No. 60/965,798, filed on Aug. 21, 2007.

(51) Int. Cl.
*A01K 85/00* (2006.01)
(52) U.S. Cl. .................. 43/42.51; 43/42.13; 43/42.19
(58) Field of Classification Search ............ 43/42.51, 43/42.13, 42.19, 42.34, 42.5
See application file for complete search history.

(56) References Cited

U.S. PATENT DOCUMENTS

| | | | | |
|---|---|---|---|---|
| 1,913,362 A | * | 6/1933 | Catarau | 43/42.06 |
| 2,235,905 A | * | 3/1941 | Sherwood | 43/42.29 |
| 2,608,787 A | * | 9/1952 | Krogue | 43/42.51 |
| 3,143,825 A | * | 8/1964 | Borgstrom | 43/42.17 |
| 4,201,006 A | * | 5/1980 | Wetherald | 43/42.06 |
| 4,435,914 A | * | 3/1984 | Norman | 43/42.12 |
| 4,625,448 A | * | 12/1986 | Borders | 43/42.11 |
| 4,641,455 A | * | 2/1987 | Johnson | 43/42.13 |
| 5,138,789 A | * | 8/1992 | Hood | 43/42.13 |
| 5,412,899 A | * | 5/1995 | Reboul | 43/42.13 |
| 5,605,004 A | * | 2/1997 | Boullt et al. | 43/42.13 |
| 6,112,451 A | * | 9/2000 | Webb | 43/42.19 |
| 6,161,325 A | * | 12/2000 | Moore | 43/42.5 |

* cited by examiner

*Primary Examiner* — Christopher P Ellis
(74) *Attorney, Agent, or Firm* — Haverstock & Owens LLP

(57) ABSTRACT

The present invention includes improvements for fishing lures. In some embodiments, a blade of a fishing lure includes a louvered hole. The louvered hole increases the blade turning action as water moves through the hole making the lure more enticing to fish resulting in more bites/strikes. The size, shape, type, color, texture and other characteristics of the blade and the overall lure are all changeable. In a second embodiment, a lure includes one or more elongated tails. In some embodiments, the elongated tails float, spin, slow down the lure and/or generate an appearance similar to a living creature. Again, the other characteristics of the lure with elongated tails are all changeable.

24 Claims, 4 Drawing Sheets

FISHING LURE

RELATED APPLICATION

This Patent Application claims priority under 35 U.S.C. 119(e) of the co-pending U.S. Provisional Patent Application Ser. No. 60/965,798 filed Aug. 21, 2007, and entitled "FISHING LURE". The Provisional Patent Application Ser. No. 60/965,798 filed Aug. 21, 2007, and entitled "FISHING LURE" is also hereby incorporated by reference.

FIELD OF THE INVENTION

The invention relates to the field of fishing. More specifically, the invention relates to improved fishing lures.

BACKGROUND OF THE INVENTION

When fishing, the main goal is to catch fish, particularly as many fish as possible and sometimes, as many large fish as possible. One method of catching fish is by using live bait. However, for those who prefer more of a challenge or partake in tournaments where live bait is not permitted, a lure must be used. There are many lures in existence; however, some generally have more success than others.

SUMMARY OF THE INVENTION

The present invention includes improvements for fishing lures by including a louvered hole which increases blade turning action as water moves through the hole making the lure more enticing to fish resulting in more bites/strikes. The size, shape, type, color, texture and other characteristics of the blade and the overall lure are all changeable.

In a second embodiment, a lure includes one or more elongated tails. In some embodiments, the elongated tails float, spin, slow down the lure and/or generate an appearance similar to a living creature. Again, the other characteristics of the lure with elongated tails are all changeable.

DETAILED DESCRIPTION OF THE PREFERRED EMBODIMENT

Figure 1:
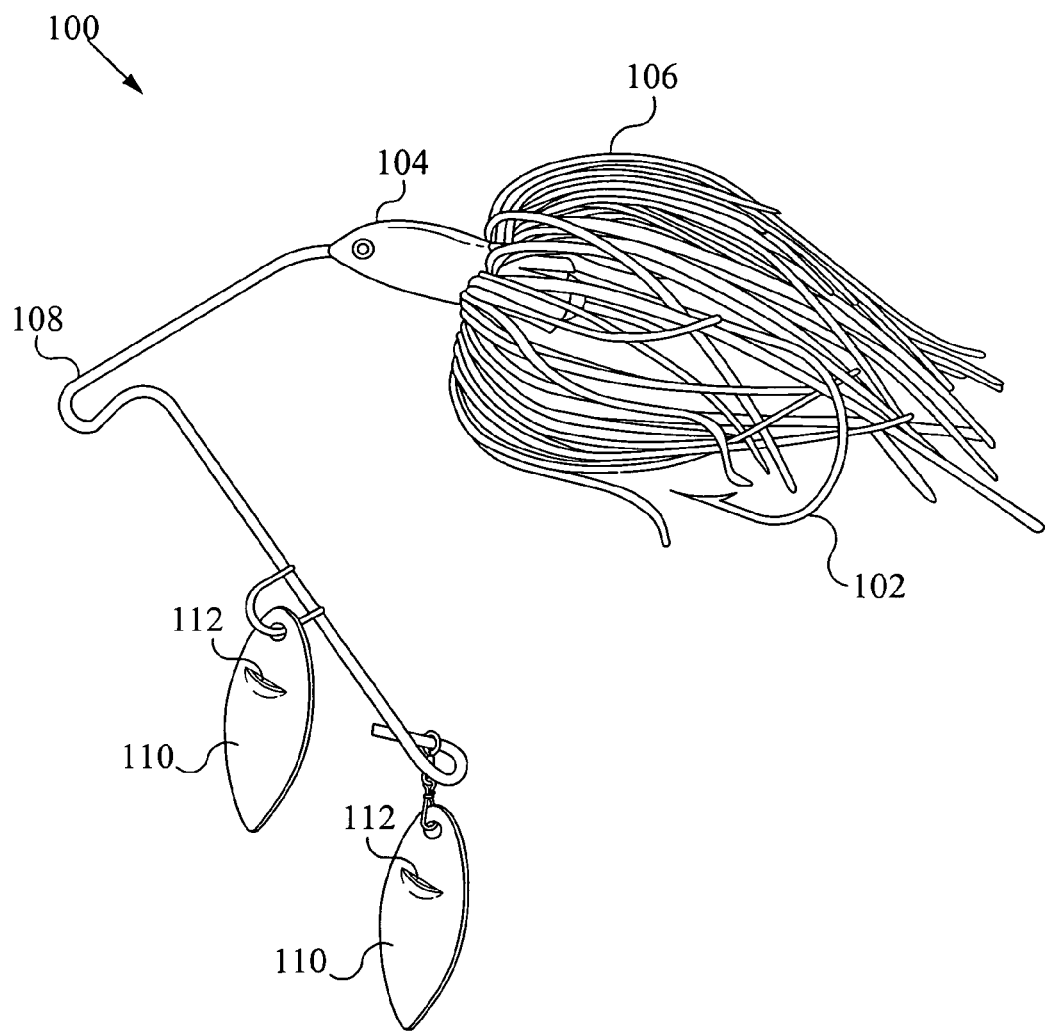
FIG. 1 illustrates a side view of an embodiment of an improved fishing lure with louvered blades in accordance with the system of the present invention.

FIG. 1 illustrates a side view of an embodiment of an improved fishing lure 100 with louvered blades in accordance with the system of the present invention. The improved fishing lure 100 includes known components such as a hook 102 and in some embodiments, a head 104, a silicone skirt 106 and an R-shaped bend 108. Coupled with the hook 102 are one or more blades 110 each with a louvered hole 112. The louvered hole 112 is not simply a circular hole within the blade. Instead, the louvered hole 112 is a slit where a first side of the blade 110 is slightly indented and a second side of the blade 110 is slightly protruding. In some embodiments, the blades 110 are spinning blades which spin as the lure is pulled through the water. In addition to water moving around the spinning blades, some water also goes through the louvered holes 112 which increases the turning action of the blades 110, making the improved fishing lure 100 more enticing to fish causing the fish to bite more often. In some embodiments, the blades 110 have a torpedo shape as shown in FIG. 1. In some embodiments, the blades 110 have patterns or textures. The blades 110 are made of any appropriate material including, but not limited to, metals, plastics and other materials. It is contemplated that other known fishing lure components are able to be included as well. Less components are also able to be included, such as a configuration including only a hook 102 with one or more blades 110 each containing a louvered hole 112. In some embodiments, only one blade includes a louvered hole and the other blade or blades do not. Additional variations are possible as well.

Figure 2:
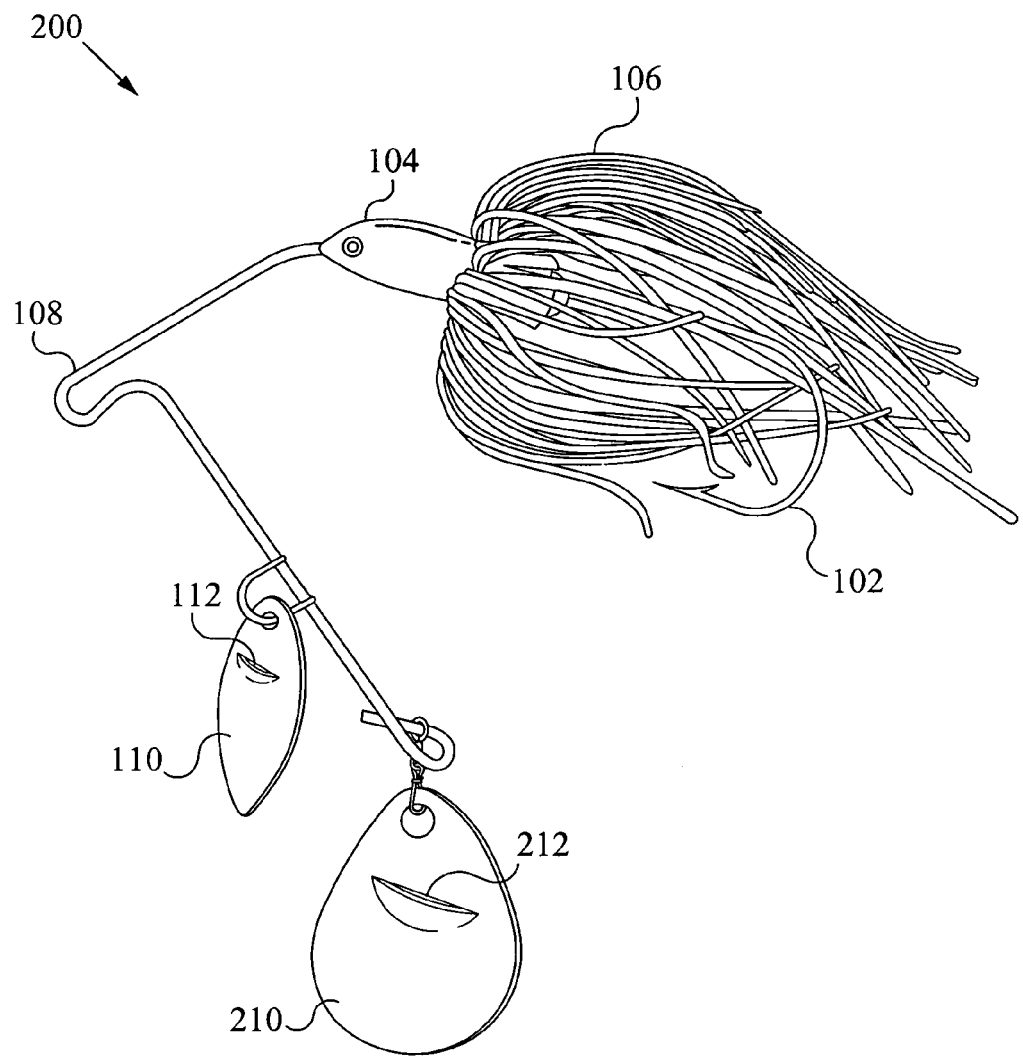
FIG. 2 illustrates a side view of an embodiment of an improved fishing lure with louvered blades in accordance with the system of the present invention.

FIG. 2 illustrates a side view of an embodiment of an improved fishing lure 200 with louvered blades in accordance with the system of the present invention. In FIG. 2, the improved fishing lure 200 includes one or more torpedo-shaped blades 110 each with a louvered hole 112 and one or more teardrop-shaped blades 210 each with a louvered hole 212. Again, the louvered hole 212 generates more turning action in the blades 210. The lure 200 also includes known components such as a hook 102, a head 104, a silicone skirt 106 and an R-shaped bend 108. The blades 210 are made of any material, including but not limited to, metals, plastics and other materials. It is contemplated that more or less fishing components are able to be included within the improved lure 200.

Figure 3A:
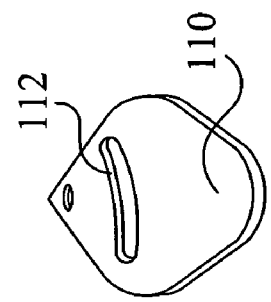
FIG. 3A illustrates a top front view of an embodiment of a blade with a louvered hole in accordance with the system of the present invention.
Figure 3B:
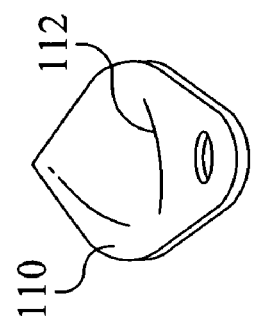
FIG. 3B illustrates a top rear view of an embodiment of a blade with a louvered hole in accordance with the system of the present invention.
Figure 3C:
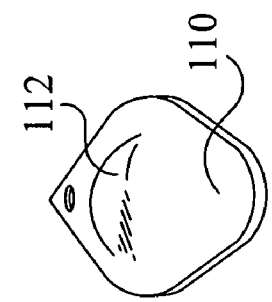
FIG. 3C illustrates a bottom front view of an embodiment of a blade with a louvered hole in accordance with the system of the present invention.
Figure 3D:
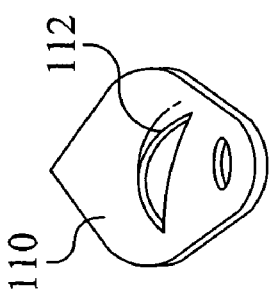
FIG. 3D illustrates a bottom rear view of an embodiment of a blade with a louvered hole in accordance with the system of the present invention.

FIGS. 3A-D illustrate varying views of a blade 110 with a louvered hole 112. As described, the blade is able to be any shape. FIG. 3A illustrates a top front view of the blade 110. As is shown in FIG. 3A, the louvered hole 112 results in a section of the blade 110 protruding out above the plane of the blade 110. FIG. 3B illustrates a top rear view of the blade 110. As is shown in FIG. 3B, from this angle the protrusion is visible but the aperture of the louvered hole 112 of the blade 110 is not. FIG. 3C illustrates a bottom front view of the blade 110. As is shown in FIG. 3C, an indentation is visible where the louvered hole 112 of the blade 110 is. FIG. 3D illustrates a bottom rear view of the blade 110. As is shown in FIG. 3D, the louvered hole 112 is visible in the blade 110.

To utilize the improved fishing lure with one or more blades including louvered holes, a user utilizes the lure as he would use any other lure with blades. After casting the lure with his rod, the user reels in the lure at a desired velocity. There are many ways of reeling in a lure which are well known by those skilled in the art. The louvered holes automatically affect the action of the lure.

In operation, the improved fishing lure with one or more blades each containing a louvered hole increases turning action as the lure is pulled through the water, thus enticing more fish to strike/bite the lure.

Although specific lures have been described above, any lure which includes a blade is able to incorporate the louvered hole blade.

Figure 4:
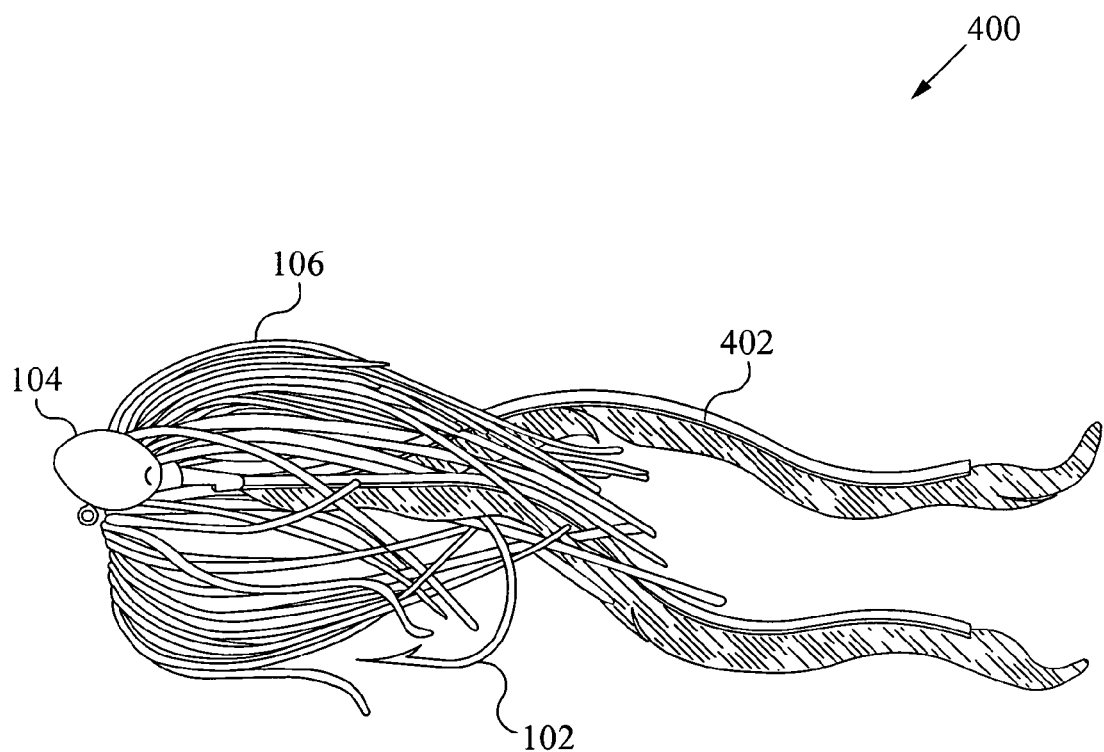
FIG. 4 illustrates a side view of a second embodiment of an improved fishing lure with one or more elongated tails in accordance with the system of the present invention.

FIG. 4 illustrates a side view of a second embodiment of an improved fishing lure 400 with one or more elongated tails in accordance with the system of the present invention. The improved fishing lure 400 includes known components such as a hook 102 and in some embodiments a head 104 and a silicone skirt 106. Coupled with the hook 102 are one or more elongated tails 402. In some embodiments, the elongated tails 402 comprise animal components such as rabbit skin and fur. In other embodiments, the elongated tails 402 comprise squirrel skin and fur. In some embodiments, the elongated tails 402 comprise synthetic components designed to simulate an animal appearance. It should be apparent that the elongated tails 402 are able to comprise any appropriate skin, fur or other material, natural or synthetic. In some embodiments, the elongated tails 402 include a pattern such as a striped pattern. The elongated tails 402 serve multiple purposes. In some embodiments, the elongated tails 402 float or at least sink less quickly than the rest of the lure. By sinking less quickly, the elongated tails 402 extend behind the front of the lure and appear to be legs, such as crawdad pinchers. Also, by moving at a slightly different speed than the rest of the lure, by applying jerking movements to the lure, the elongated tails 402 again are able to represent an animal such as a crawdad hopping or swimming in the water. When pulled quickly through the water, in some embodiments, the elongated tails 402 float. The acting motion is able to attract fish. It is contemplated that other known fishing lure components are able to be included as well. Less components are also able to be included or excluded, such as a configuration including only a hook 102 with one or more elongated tails 402.

To utilize the improved fishing lure with elongated tails, a user utilizes the lure depending on how he wants the lure to appear. After casting the lure, if the user wants to have the lure appear as a living animal with the elongated tails trailing behind, the user does not reel in for a few seconds. If the user wants the lure to appear as a twitching, swimming or jumping animal, the user periodically jerks the lure and possibly reels in as well. If the user wants the elongated tails to move, the user reels in the lure at a relatively rapid speed. Other techniques of utilizing the lure are available as well.

In operation, the improved fishing lure with elongated tails is able to appear better as a living animal or as a swimming/hopping animal. The elongated tails move when the lure is pulled appropriately.

Any lure that is structurally compatible is able to include the elongated tails of the second embodiment.

The improved fishing lures are able to be any color, shape, material and/or have other characteristics as long as the desired effects are still accomplished.

The present invention has been described in terms of specific embodiments incorporating details to facilitate the understanding of principles of construction and operation of the invention. Such reference herein to specific embodiments and details thereof is not intended to limit the scope of the claims appended hereto. It will be readily apparent to one skilled in the art that other various modifications may be made in the embodiment chosen for illustration without departing from the spirit and scope of the invention as defined by the appended claims.

What is claimed is:

1. A fishing lure comprising:
 a. a hook; and
 b. a louvered blade, coupled to the hook, having a first side and a second side, wherein the blade contains a louvered hole that protrudes above a plane of the first side and is indented below a plane of the second side.

2. The fishing lure according to claim 1, further comprising a number of additional blades, louvered blades, and hooks coupled to the louvered blade.

3. The fishing lure according to claim 2, wherein a number of the blades and louvered blades have patterns or textures.

4. The fishing lure according to claim 3, wherein a number of the blades and louvered blades are made of metals or plastics.

5. The fishing lure according to claim 4, wherein a number of the blades and louvered blades are torpedo or teardrop shaped.

6. The fishing lure according to claim 5, further comprising a number of heads, skirts, elongated tails and R-shaped bends coupled to the louvered blade.

7. The fishing lure according to claim 6, wherein a number of the skirts are made of silicone.

8. The fishing lure according to claim 7, wherein a number of the elongated tails are comprised of a selection of skin, fur, or other natural or synthetic material.

9. The fishing lure according to claim 8, wherein a number of the elongated tails are patterned.

10. The fishing lure according to claim 9, wherein a number of the elongated tails have sufficient buoyancy to float or sink less quickly than the rest of the fishing lure.

11. A louvered blade, within a fishing lure, having a first side and a second side, wherein the louvered blade contains a louvered hole that protrudes above a plane of the first side and is indented below a plane of the second side.

12. The louvered blade according to claim 11, wherein the louvered blade has a pattern or texture.

13. The louvered blade according to claim 11, wherein the louvered blade is made of metals or plastics.

14. The louvered blade according to claim 11, wherein the louvered blade is torpedo or teardrop shaped.

15. A fishing lure comprising:
 a. one or more hooks;
 b. one or more louvered blades, coupled to the one or more hooks, having a first side and a second side, wherein the one or more louvered blades contain a louvered hole that protrudes above a plane of the first side and is indented below a plane of the second side; and
 c. one or more elongated tails coupled to the one or more hooks such that the elongated tail extends behind the fishing lure.

16. The fishing lure according to claim 15, wherein a number of additional elongated tails, blades, louvered blades, and hooks are coupled to the one or more elongated tails.

17. The fishing lure according to claim 16, wherein a number of the elongated tails have sufficient buoyancy such that they float or sink less quickly than the other aspects of the fishing lure.

18. The fishing lure according to claim 17, wherein a number of the blades and louvered blades have patterns or textures.

19. The fishing lure according to claim 18, wherein a number of the blades and louvered blades are made of metals or plastics.

20. The fishing lure according to claim 19, wherein a number of the blades and louvered blades are torpedo or teardrop shaped.

21. The fishing lure according to claim 20, further comprising a number of heads, skirts, and R-shaped bends coupled to the elongated tail.

22. The fishing lure according to claim 21, wherein a number of the skirts are made of silicone.

23. The fishing lure according to claim 22, wherein the elongated tails are comprised of a selection of skin, fur, or other natural or synthetic material.

24. The fishing lure according to claim 23, wherein a number of the elongated tails are patterned.

* * * * *